Jan. 31, 1950 A. E. DENTLER 2,495,920
FRICTION SHOCK ABSORBER
Filed Aug. 25, 1945
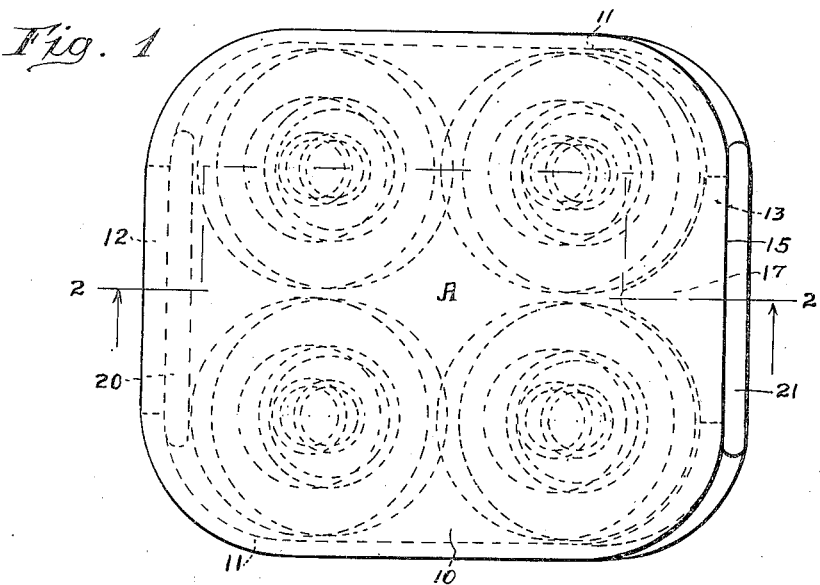
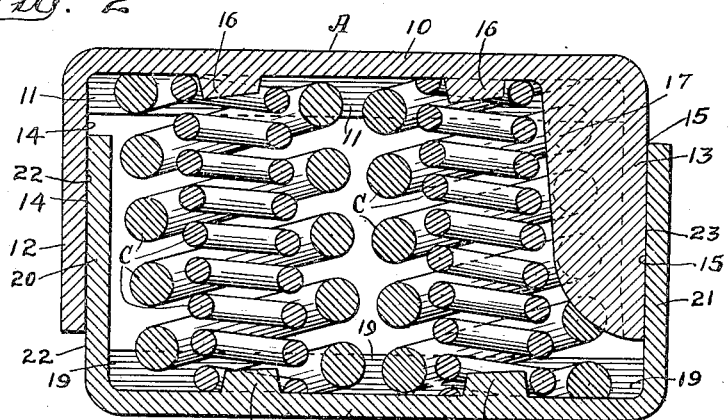
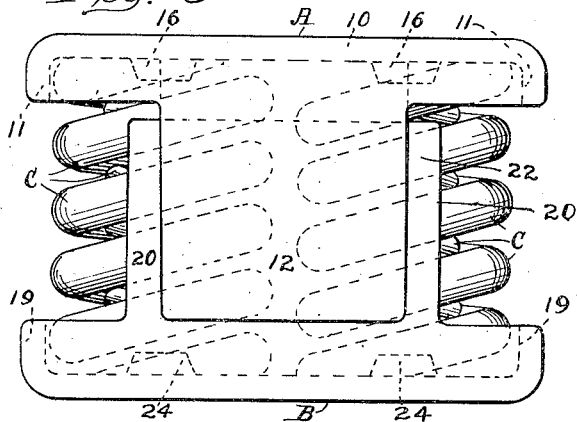
Inventor:
Arnold E. Dentler.
By Henry Fuchs.
Atty.

Patented Jan. 31, 1950

2,495,920

UNITED STATES PATENT OFFICE 2,495,920

FRICTION SHOCK ABSORBER

Arnold E. Dentler, La Grange, Ill., assignor to W. H. Miner, Inc., Chicago, Ill., a corporation of Delaware Application August 25, 1945, Serial No. 612,671

6 Claims. (Cl. 267—9)

This invention relates to improvements in friction shock absorbers.

One object of the invention is to provide a simple and efficient friction shock absorber which may be employed in a railway car truck in the manner of the usual truck springs, to carry the load and absorb vibrations to which the car is subjected in service.

A more specific object of the invention is to provide a shock absorber of the character indicated comprising two relatively movable friction members having sliding contact with each other and helical coil springs yieldingly opposing relative approach of said members, wherein the springs are placed with their longitudinal axes slightly inclined or canted with respect to the vertical, whereby the tendency of the springs to straighten out or assume a vertical position forces the friction members into tight frictional engagement with each other, thus snubbing the action of the springs.

Other objects of the invention will more clearly appear from the description and claims hereinafter following.

In the drawing forming a part of this specification, Figure 1 is a top plan view of my improved shock absorber. Figure 2 is a vertical sectional view, corresponding substantialy to the line 2—2 of Figure 1. Figure 3 is an end elevational view of the shock absorber shown in Figure 1, looking from left to right in said figure.

As shown in the drawing, my improved friction shock absorber comprises broadly upper and lower friction members A and B, and four spring units C—C—C—C.

The upper friction member A comprises a relatively heavy plate element 10 having downturned shallow flanges 11—11 at opposite sides thereof, and depending platelike arms 12 and 13 at opposite ends. The arms 12 and 13 extend substantially vertically, as clearly shown in Figure 2. The arm 12 presents a flat, vertically extending friction surface 14 on the inner side and the arm 13 a vertical flat friction surface 15 on the outer side. The plate element 10 is provided with four spring centering bosses 16—16 and 16—16, which are inclined to the vertical. The upper friction member A is further provided with a spring centering web 17, which extends laterally inwardly from the depending arm 13 and has concave side faces to fit the outer portions of the spring units C—C.

The lower friction member B comprises a relatively heavy, flat, rectangular, platelike section 18 having upstanding, relatively shallow flanges 19—19 at opposite sides thereof. The plate section 18 is also provided with upstanding arms 20 and 21 at opposite ends thereof. The arm 20 engages in back of the arm 12 of the upper member A and presents a vertically extending, flat friction surface 22 on the outer side engaging the surface 14 of the arm 12. The arm 21 engages over the arm 13 of the member A and has a substantially flat, vertically extending friction surface 23 on the inner side engaging the friction surface 15 of the arm 13. As clearly shown in Figure 3, the arms 20 and 21 are somewhat wider than the arms 12 and 13. The platelike section 18 is further provided with four spring centering bosses 24—24—24—24, which are inclined to the vertical and are laterally offset with respect to the bosses 16—16—16—16 of the member A, as most clearly shown in Figure 2.

Four spring units C—C—C—C are interposed between the plate sections of the members A and B. Each unit C comprises a relatively heavy, outer coil and a lighter inner coil. The spring centering bosses 16 and 24 of the upper and lower members A and B engage within the top and bottom ends of the inner coils of each unit C to hold the same centered and in inclined position with respect to a vertical axis.

My improved friction shock absorber when used to yieldingly support the body of a car is interposed between the usual truck bolster and the spring plank of the truck, the plate sections or portions 10 and 18 of the friction members A and B functioning in the manner of the usual spring plates of truck springs and engaging respectively the underneath side of the truck bolster and the top surface of the spring plank.

The operation of my improved shock absorber is as follows: Upon relative approach of the friction members A and B, due to compression of the shock absorber between the truck bolster and the spring plank of a car, the spring units C—C—C—C sustain the load and are compressed to absorb the shock and, inasmuch as the inclined spring units C—C—C—C tend to assume a true vertical position, the friction members are forced in opposite directions, pressing the friction surfaces of the arms 12 and 13 into tight frictional engagement with the friction surfaces of the arms 20 and 21 of the upper and lower members with the result that snubbing action of the springs is produced. Such snubbing action is produced in both compression and recoil of the mechanism.

Although my improved shock absorber has been hereinbefore described as applied to railway car trucks, it will be evident to those skilled in this art that the same may be employed as a shock absorber for other purposes, such as railway draft riggings to absorb buff and draft shocks. In fact, the shock absorber may be used between any relatively movable parts to absorb shocks.

I claim:

1. In a friction shock absorber, the combination with upper and lower followers; of upstanding spring units between said followers and having their top and bottom ends bearing on said followers; spring centering means on said followers, respectively; depending friction members on said upper follower; and upstanding friction members on said lower follower slidingly engaged with the friction members of the upper follower, the spring centering means and friction members of one of said followers being laterally offset in the same direction with respect to the spring centering means and friction members of the other follower to maintain said spring units in tilted inclined position.

2. In a friction shock absorber, the combination with a follower member having fixed friction elements at opposite ends thereof at right angles thereto; of a second follower member having fixed friction elements at opposite ends thereof at right angles thereto, the friction elements at opposite ends of said first named member engaging respectively the outer side of the element which is at one end, and the inner side of the element which is at the other end of said second named member, said follower members being relatively movable toward each other member, said followers being relatively movable toward each other; and coil spring units upstanding between said follower members and bearing at opposite ends on said members respectively; and means on said follower members for holding said spring units inclined with the ends thereof engaging said first named member tilted toward the friction element thereof which engages the outer side of the corresponding friction element of the second named member.

3. In a friction shock absorber, the combination with upper and lower follower members, said upper follower member having depending friction plate sections at opposite ends thereof, said lower follower member having upstanding friction plate sections at opposite ends, the upstanding plate section at one end of said lower follower engaging the inner side of the depending plate section at the corresponding end of the upper follower, and the upstanding plate section at the other end of said lower follower engaging the outer side of the depending plate section at the corresponding end of the upper follower; upstanding yielding means interposed between said follower members resisting relative movement of the same toward each other; and means on said followers respectively holding the opposite ends of said yielding means against lateral displacement, said holding means maintaining the yielding means in inclined position with the upper end thereof tilted toward the depending plate section of the upper follower member which is engaged at its inner side by the cooperating plate section of the lower follower member.

4. In a friction shock absorber, the combination with upper and lower follower members, said upper follower member having depending friction plate sections at opposite ends thereof, said lower follower member having upstanding friction plate sections at opposite ends, the upstanding plate section at one end of said lower follower engaging the inner side of the depending plate section at the corresponding end of the upper follower, and the upstanding plate section at the other end of said lower follower engaging the outer side of the depending plate section at the corresponding end of the upper follower; upstanding, laterally tilted coil springs interposed between said follower members and yieldingly resisting relative movement of the same toward each other said springs being inclined upwardly toward said friction plate section of the upper follower member which is engaged on its inner side by the corresponding plate section of the lower follower member; and spring centering projections on said upper and lower follower members holding said springs in said tilted position.

5. In a friction shock absorber, the combination with upper and lower follower members, said upper follower member having depending friction plate sections at opposite ends thereof, said lower follower member having upstanding friction plate sections at opposite ends, the upstanding plate section at one end of said lower follower engaging the inner side of the depending plate section at the corresponding end of the upper follower, and the upstanding plate section at the other end of said lower follower engaging the outer side of the depending plate section at the corresponding end of the upper follower; upstanding spring units interposed between and bearing at the top and bottom ends on said follower members; and means on said follower members positioning the opposite ends of said spring units to hold said spring units in tilted position with their longitudinal central axes inclined to the vertical upwardly toward the depending friction plate section of the upper follower member which is engaged on its inner side.

6. In a friction shock absorber, the combination with upper and lower follower members, said upper follower member having depending friction plate sections at opposite ends thereof, said lower follower member having upstanding friction plate sections at opposite ends, the upstanding plate section at one end of said lower follower engaging the inner side of the depending plate section at the corresponding end of the upper follower, and the upstanding plate section at the other end of said lower follower engaging the outer side of the depending plate section at the corresponding end of the upper follower; upstanding, helical coil spring units interposed between and bearing at their top and bottom ends on said follower members; spring centering bosses on said upper and lower follower members engaging within said coil spring units, said bosses of the upper follower member being offset laterally with respect to said bosses of the lower follower member toward said depending friction plate section of the upper follower member which is engaged on its inner side, to hold said spring units in tilted position with their longitudinal central axes inclined to the vertical.

ARNOLD E. DENTLER.

REFERENCES CITED

The following references are of record in the file of this patent:

UNITED STATES PATENTS

| Number | Name | Date |
|---|---|---|
| 709,999 | McCord | Sept. 30, 1902 |
| 714,752 | Shea | Dec. 2, 1902 |
| 754,594 | McKeen | Mar. 15, 1904 |
| 1,140,101 | Bauer | May 18, 1915 |
| 1,255,214 | O'Connor | Feb. 5, 1918 |
| 2,404,475 | Davidson | July 23, 1946 |
| 2,410,160 | Haseltine | Oct. 29, 1946 |
| 2,410,165 | Johnson et al. | Oct. 29, 1946 |